(12) United States Patent
Schmitt et al.

(10) Patent No.: US 7,893,370 B2
(45) Date of Patent: Feb. 22, 2011

(54) MODULE FRONT FOR A SWITCHGEAR ASSEMBLY MODULE, SWITCHGEAR ASSEMBLY MODULE AND ELECTRICAL SWITCHGEAR ASSEMBLY

(75) Inventors: Hans-Jürgen Schmitt, Hirschberg (DE); Klaus Kraft, Heidelberg (DE); Hans-Peter Merkel, Schriesheim (DE); Klaus-Georg Müller, Wilhelmsfeld (DE)

(73) Assignee: ABB Patent GmbH, Ladenburg (DE)

( * ) Notice: Subject to any disclaimer, the term of this patent is extended or adjusted under 35 U.S.C. 154(b) by 526 days.

(21) Appl. No.: 11/887,912

(22) PCT Filed: Mar. 25, 2006

(86) PCT No.: PCT/EP2006/002764

§ 371 (c)(1),
(2), (4) Date: Oct. 5, 2007

(87) PCT Pub. No.: WO2006/105881

PCT Pub. Date: Oct. 12, 2006

(65) Prior Publication Data

US 2009/0052121 A1 Feb. 26, 2009

(30) Foreign Application Priority Data

Apr. 8, 2005 (DE) .................. 10 2005 016 544

(51) Int. Cl.
*H01H 9/00* (2006.01)

(52) U.S. Cl. .................. 200/50.21; 200/400

(58) Field of Classification Search ... 200/50.21–50.27, 200/400, 401, 500, 501, 330, 331; 361/600, 361/605–621
See application file for complete search history.

(56) References Cited

U.S. PATENT DOCUMENTS

| 3,288,956 A | * | 11/1966 | Jencks et al. | ............. 200/50.23 |
| 4,017,698 A | * | 4/1977 | Kuhn et al. | ............. 200/50.21 |
| 4,038,585 A | * | 7/1977 | Wolski et al. | ............. 361/624 |
| 4,206,329 A | * | 6/1980 | Jarosz | ............. 200/50.26 |

(Continued)

FOREIGN PATENT DOCUMENTS

DE 36 28 113 A1 2/1988

(Continued)

OTHER PUBLICATIONS

PCT/ISA/210 for PCT/EP2006/002764 dated Jun. 12, 2006.

(Continued)

*Primary Examiner*—Michael A Friedhofer
(74) *Attorney, Agent, or Firm*—Buchanan Ingersoll & Rooney PC

(57) ABSTRACT

The invention relates to a module front for a switchgear module, particularly a slide-in module, comprising a control device, the control device being integrated in the module front, and the module front forms an integral component of the switchgear module. The invention relates to a switchgear module, particularly a slide-in module provided with an inventive module front, and to a switchgear equipped with at least one switchgear module of this type.

12 Claims, 3 Drawing Sheets

U.S. PATENT DOCUMENTS

Figure 1:
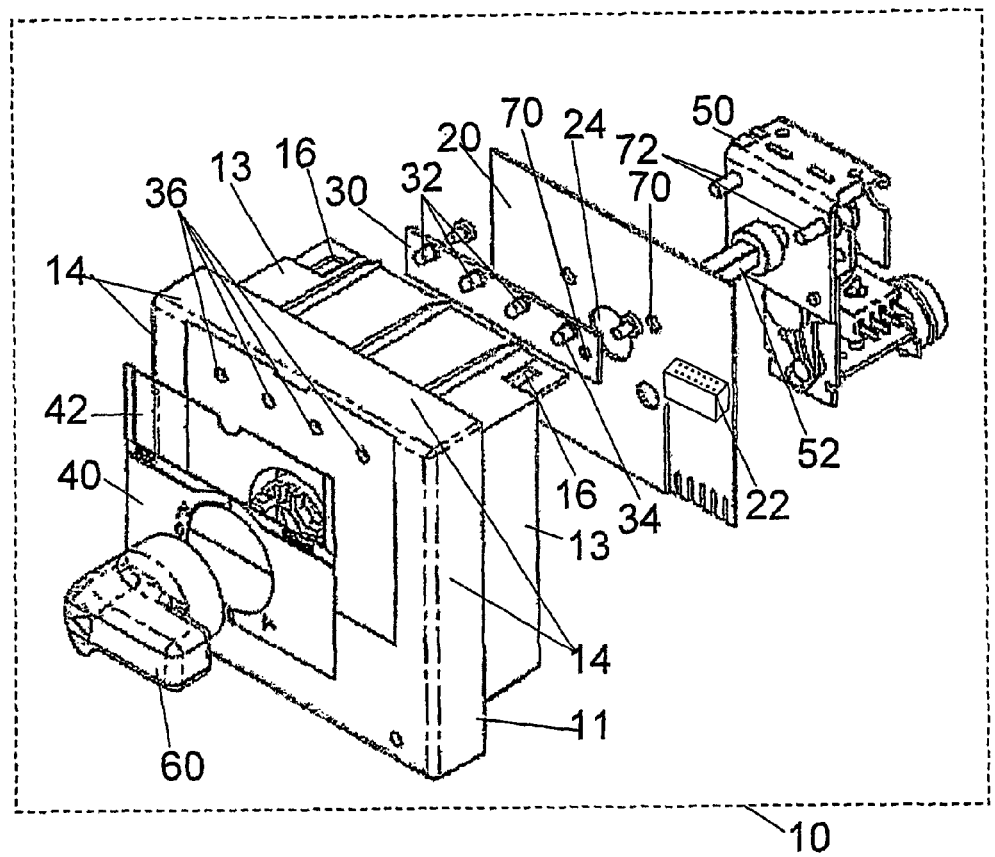

| | | | |
|---|---|---|---|
| 5,095,403 A | 3/1992 | Pin et al. | |
| 5,902,973 A * | 5/1999 | Ramey et al. | 200/50.01 |
| 6,075,215 A * | 6/2000 | Bollinger et al. | 200/317 |
| 6,130,392 A * | 10/2000 | Blessitt et al. | 200/400 |
| 6,166,343 A * | 12/2000 | Blessitt et al. | 200/400 |
| 6,169,651 B1 | 1/2001 | Dias | |
| 6,252,186 B1 * | 6/2001 | Liebetruth et al. | 200/43.01 |
| 6,289,267 B1 | 9/2001 | Alexander et al. | |
| 6,304,919 B1 * | 10/2001 | Louis et al. | 710/1 |
| 6,506,990 B2 * | 1/2003 | Marin-Pache et al. | 200/400 |
| 7,022,923 B2 * | 4/2006 | Liebetruth | 200/50.21 |
| 7,186,933 B2 * | 3/2007 | Turner | 200/50.21 |
| 7,612,988 B2 * | 11/2009 | Ulinskas | 361/614 |
| 2003/0057067 A1 * | 3/2003 | Bach et al. | 200/50.26 |

FOREIGN PATENT DOCUMENTS

| | | |
|---|---|---|
| DE | 8811088 | 1/1989 |
| DE | 195 11 648 A1 | 10/1996 |
| DE | 195 23 592 A1 | 1/1997 |
| DE | 296 22 062 US | 4/1997 |
| DE | 694 12 151 T2 | 2/1999 |
| DE | 100 01 053 C1 | 1/2001 |
| DE | 101 19 456 C1 | 5/2003 |
| EP | 0 621 670 A1 | 10/1994 |

OTHER PUBLICATIONS

German Search Report dated Jul. 7, 2007.

* cited by examiner

MODULE FRONT FOR A SWITCHGEAR ASSEMBLY MODULE, SWITCHGEAR ASSEMBLY MODULE AND ELECTRICAL SWITCHGEAR ASSEMBLY

The disclosure relates to a module front for a switchgear assembly module, in particular a withdrawable module, and to a switchgear assembly module having a module front and an electrical switchgear assembly, in particular a medium-voltage or low-voltage switchgear assembly, having at least one such switchgear assembly module having a module front.

Continuously increasing and often changing demands in the processing industry and in electrical engineering bring about the need for the use of medium-voltage and low-voltage switchgear assemblies which can be converted and maintained as simply as possible. Current assemblies in this regard generally have a plurality of switchgear cabinets which are designed using withdrawable part technology and are comparatively easy to fit with components and to configure. Withdrawable part technology in this context means that all the electrical operating means and electrical devices, such as control and/or measuring devices installed as components, for example, are preferably arranged on modularized withdrawable parts.

Advantageous here is the simplified accessibility of the respective withdrawable module by virtue of the fact that, if required, for example in the event of a fault or of a failure, but also in the event of the respective switchgear assembly being reconfigured, this withdrawable module can be removed easily from the respective switchgear cabinet and replaced by a suitable module.

Disadvantageously, however, the control and/or measuring devices installed are in general conventional, generally available electrical and electronic components which have not been adapted for use in withdrawable part technology and which often require a comparatively large amount of space and cause increased configurational complexity. In the context of repair and servicing measures, this then usually also results in longer maintenance times and downtimes.

Furthermore, the increased amount of space required for individual components often necessitates physical overdimensioning of the actual module since, owing to the specific arrangement and geometry of the individual components (a module can only be as small as its largest component), a large proportion of the converted space is usually unusable.

The object of the invention is to specify, for a given functionality, a switchgear assembly module having a control device with simplified handling and improved utilization of space.

This object can be achieved by a switchgear assembly, a switchgear assembly module and a module front embodiments of each of which are described herein. Advantageous configurations of the invention are specified in the dependent claims and in the description of the figures.

The electrical switchgear assembly according to the invention in this case has at least one switchgear assembly module, in particular a withdrawable module, having a module front having an integrated control device, the module front also being an integral part of the respective switchgear assembly module.

With the aid of the module front according to the invention, which is matched to the respective size requirements of the module technology and has an integrated control device, it is now possible to make best possible use of the space available in the switchgear assembly module in question. Furthermore, handling of the respective switchgear assembly module and therefore of the electrical switchgear assembly is also improved and simplified by virtue of the fact that, if required, in the event of a fault and/or in the event of maintenance or servicing work on the control device, only the module front according to the invention needs to be replaced, without the remaining components and internals of the respective switchgear assembly module being affected. It is therefore possible to insert the switchgear assembly module in the electrical switchgear assembly correctly again as quickly as possible merely by changing the module front.

In this case, the control device integrated in the module front in an advantageous configuration of the invention comprises a control board, via which control commands and instructions from an external drive system are processed and/or are passed on to corresponding devices and/or internals in the module or said devices and/or internals are controlled.

Furthermore, it is advantageously possible to provide that status details or status information relating to the at least one switchgear assembly module are made available for callup via a preconfigurable interface.

The preconfigurable interface may in this case be, in particular, an interface which can be read by a correspondingly set-up data processing device, for example an RS-232, RS485/RS422 and/or a USB interface. It is also advantageously possible to provide conventional power links or bus links for reading the relevant status information via a corresponding bus system or control system and/or via a local or global network, in particular the Internet, for example for the purpose of a remote diagnosis. As an alternative to this, interfaces for wireless information transmission to a corresponding control system and/or a data processing device set up for this purpose, for example by means of wireless LAN (WLAN) or Bluetooth, can also be provided.

In a further embodiment of the invention, a display device is also integrated in the module front, which display device visually displays status information relating to the withdrawable module. In this case, the display device preferably also comprises an LED board, which can be populated with a plurality of LEDs and/or a plurality of colored and/or at least one monochromatic or multicolored LED in order to display relevant status information in color-coded fashion.

Furthermore, an adhesive label with an integrated label carrier can additionally be provided, it being possible to insert an insert label which can be written on freely into the label carrier.

In addition to the visual display of the status information, an alternative configuration of the display device also provides for an acoustic display of predeterminable status information, for example in the form of a warning tone or signal generated by an acoustic signal transmitter when a predetermined module state is reached, in particular when there is a functional failure or a functional fault.

The invention will be described further with reference to some figures and exemplary embodiments.

Figure 2:
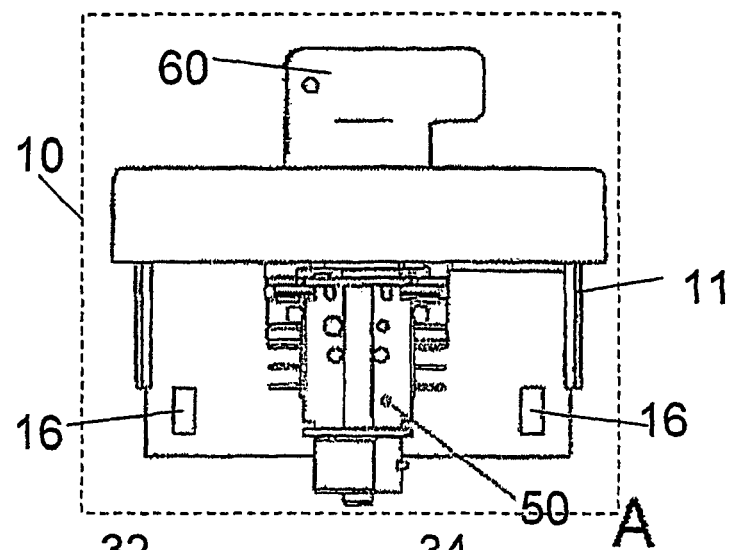
Figure 3:
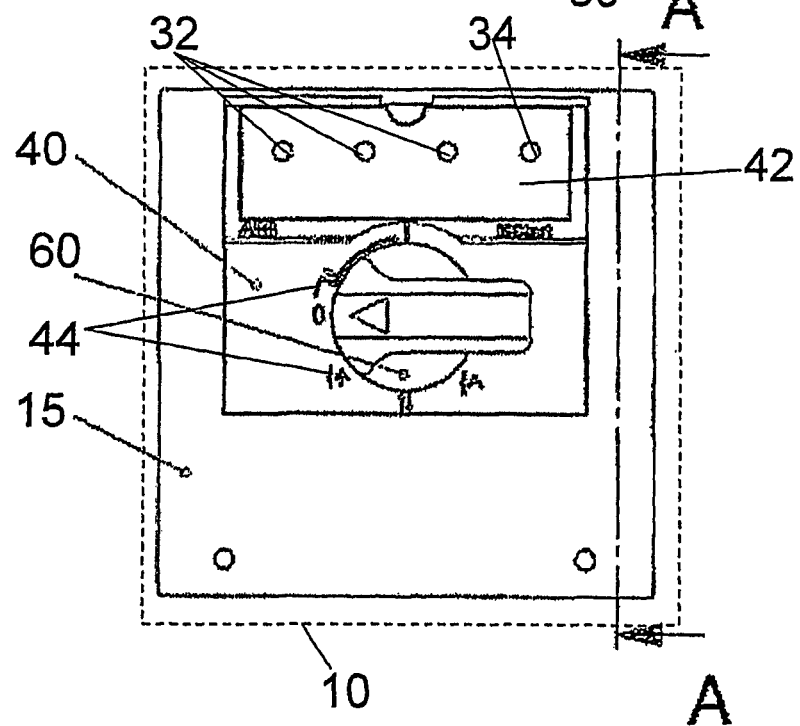
Figure 4:
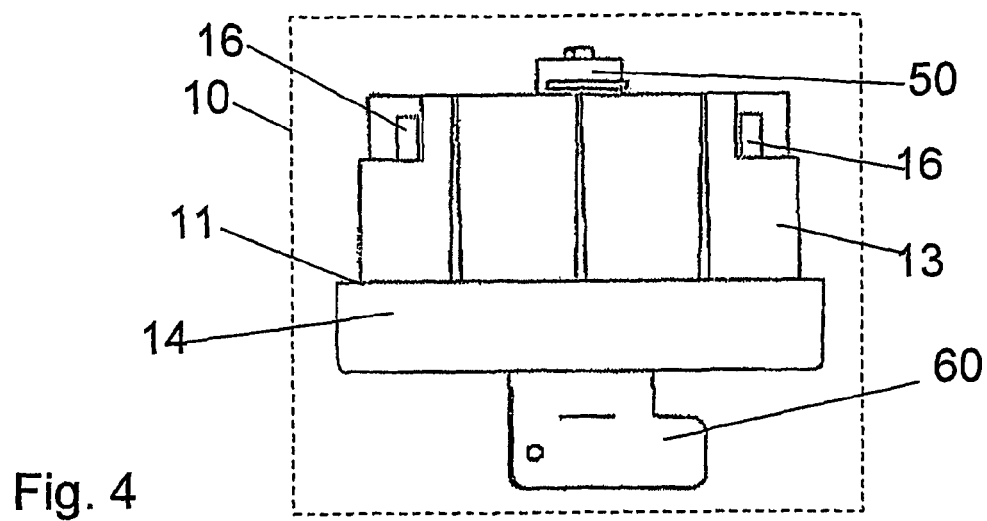
Figure 5:
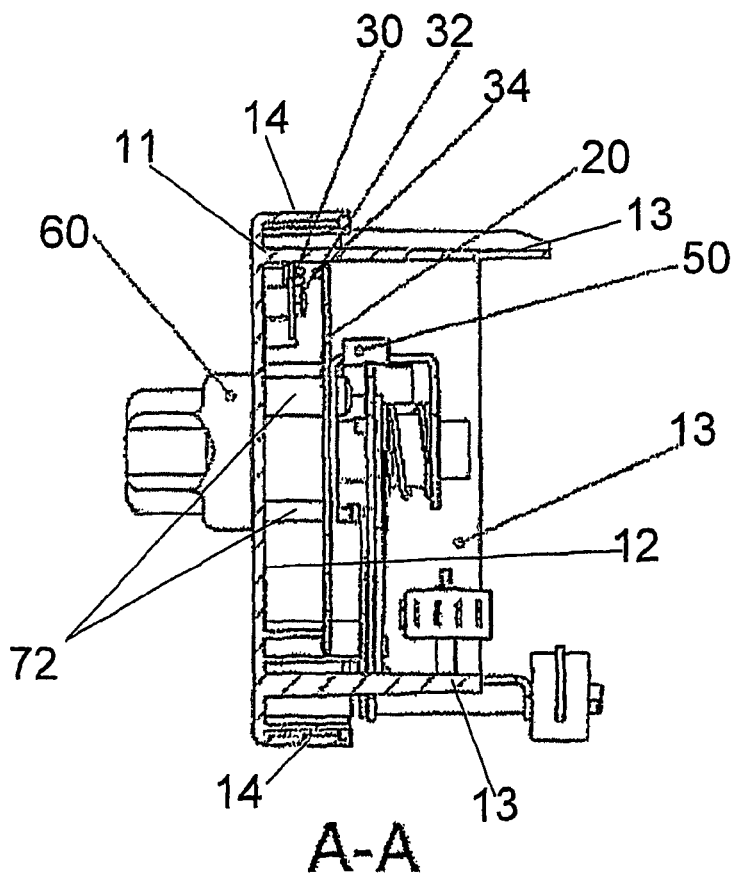

The invention, advantageous configurations and improvements of the invention and particular advantages of the invention will be explained and described in more detail with reference to the exemplary embodiments illustrated in the attached drawings, in which:

FIG. 1 shows an exploded illustration of a module front with an exemplary configuration for a switchgear assembly module of an electrical switchgear assembly, FIG. 2 shows an illustration of the module front with the exemplary configuration shown in FIG. 1, in a viewing direction from below, FIG. 3 shows an illustration of the module front with the exemplary configuration shown in FIG. 1, in a front view, FIG. 4 shows an illustration of the module front with the exemplary configuration shown in FIG. 1, in a plan view, and FIG. 5 shows a lateral sectional view of the module front with the exemplary configuration shown in FIG. 1.

FIG. 1 shows a module front 10 with an exemplary configuration for a withdrawable module for an electrical switchgear assembly, in an exploded illustration.

The module front 10 shown is in this case an integral part of the respective switchgear assembly module and contributes to the formation of the module housing.

The module front 10 comprises a front element 11 in the form of a trough and having a trough base 12 and four inner side walls 13 and four outer side walls 14. Inner and outer side walls are arranged spaced apart from one another and enclose an intermediate space for accommodating the rest of the module housing. The trough base 12, whose outer side forms the front face 15 of the module front 10, in this case has a virtually rectangular cross-sectional area.

The module front 10 has, on its inner side walls 13, means 16 which allow for the module front 10 to be connected to the rest of the module housing, for example in the form of cutouts in order to make it possible for them to be latched with hooks of the rest of the module housing, or vice versa. The module housing and the module front in this case each have complementary connecting means.

The module front 10 comprises an integrated control device 20, which in this case is in the form, for example, of a control board, via which control commands and instructions from an external drive system can be processed. The control device 20 or the control board has at least one preconfigurable interface 22, via which status details or status information relating to the respective switchgear assembly module and/or the operating means controlled by the module can be made available for callup.

The at least one preconfigurable interface 22 may in this case be, in particular, an interface which can be read by suitable data processing devices, for example an RS-232, RS485/RS422 and/or a USB interface, but it is also advantageously possible to provide conventional power links or bus links, such as, for example, an Ethernet interface, for reading the relevant status information via a corresponding bus system or control system and/or via a local or global network. As an alternative to this or in addition to this, at least one interface for wireless information transmission to a corresponding control system and/or a data processing device set up for this purpose, for example by means of wireless LAN (WLAN) or Bluetooth, can also be provided.

Furthermore, the module front 10 has an integrated display device 30, which is in the form of an LED board and which, by accessing the control device 20, visually displays status information relating to the withdrawable module and/or the operating means controlled by the withdrawable module. The LED board 30 in this case comprises a plurality of monochromatic LEDs 32 and/or at least one multicolored LED 34 in order to display relevant status information in color-coded fashion.

In addition to the visual display of status information, an acoustic display of predetermined status information can also be provided, for example by means of an acoustic signal transmitter which emits a corresponding acoustic signal when a certain state is reached, in particular when there is a functional failure or a functional fault in the respective module and/or in the operating means controlled by the respective module.

Provided in the trough base 12 of the trough-like module front 10 are cutouts 36 and/or at least one viewing window, through which it is possible to see into the LEDs 32, 34 of the LED board 30 from the trough base outer side, i.e. from the front panel 15 of the module front 10.

Furthermore, an adhesive label 40 with an integrated label carrier 42 for accommodating an insert label which can be written on freely is provided on the trough base outer side 15, i.e. the front part of the module front 10.

In addition, the module front 10 comprises a locking unit 50, in particular a mechanical withdrawable-part locking means which is operatively connected to a rotatably mounted locking toggle 60 and/or master switch or functional switch arranged on the front panel 15, for example via a shaft 52 and a correspondingly designed transmission. Accordingly, when the switchgear assembly module is activated, locking of the switchgear assembly module in the switchgear cabinet is brought about via the module front 10 by the withdrawable-part locking means 50 and the module is secured against removal during operation. At the same time, the corresponding operating states such as test, ON, OFF and the position of the withdrawable part, such as inserted, isolated position, withdrawable part removed, for example, are passed on.

Starting from the trough base 12, first the display device 30, i.e. the LED board, then the control device 20, i.e. the control board, and finally the locking unit 50, i.e. the mechanical withdrawable-part locking means, are located within the module front 10 or the trough 12, 13 formed by the module front 10.

In order to allow for an operative connection between the locking toggle 60 and the locking unit 50, the control board 20 has at least one cutout 24 for passing through a shaft 52.

Installation aids are provided in the form of a further cutout 70 and screws 72 both on the mechanical locking unit, the control board and the LED board.

FIG. 2 shows the module front 10, with the exemplary configuration shown in FIG. 1, in the view from below, the locking toggle 60, the trough-like front element 10 and the mechanical withdrawable-part locking means 50 being indicated.

FIG. 3 shows the module front 10, with the exemplary configuration shown in FIG. 1, in the front view, i.e. in the viewing direction onto the front face 15 of the module front 10. The front face 15 of the module front 10 shows the four LEDs 32, 34 of the LED board 30, the locking toggle/toggle switch 60 and/or the master switch as well as the adhesive label 40 with the integrated label carrier 42, which is provided for accommodating an insert label which can be written on freely. The adhesive label 40 has a plurality of pictograms 44 in the region around the locking toggle/toggle switch 60, which pictograms correspond to the respectively selected function and/or the respective operating state of the switchgear assembly module.

FIG. 4 shows the module front 10, with the exemplary configuration shown in FIG. 1, in a plan view, the locking toggle 60, the trough-like module front 10 and part of the mechanical withdrawable-part locking means 50 being indicated. The remaining components are hidden by the side walls.

FIG. 5 shows the module front 10, with the exemplary configuration shown in FIG. 1, in a lateral sectional view. The section plane A-A and viewing direction on this plane are indicated in FIG. 4 by the markings A and the associated arrows. FIG. 5 indicates the arrangement and sequence of the locking toggle 60, the trough-like module front 10 with the LED board 30, the control board 20 and the mechanical withdrawable-part locking means 50.

The invention claimed is:

1. A module front for a switchgear assembly module, comprising: a control device, arranged such that it is integrated in the module front, and the module front forms an integral part of the switchgear assembly module;

wherein the control device comprises a control board, for performing at least one of processing control commands and instructions from an external drive system and controlling devices in an interior of a respective switchgear assembly module.

2. The module front as claimed in claim 1, wherein the control device has a predetermined interface, via which at least one of status information of the switchgear assembly module and information of a controlled operating means are made available for callup.

3. The module front as claimed in claim 1, wherein a display device is arranged such that it is integrated, which display device displays at least one of status information of the respective switchgear assembly module and of an operating means controlled by the switchgear assembly module.

4. The module front as claimed in claim 3, wherein the display device comprises an LED board.

5. The module front as claimed in claim 4, wherein the LED board has at least one of a plurality of monochromatic LEDs and at least one multicolored LED in order to display relevant status information in color-coded fashion.

6. The module front as claimed in claim 3, wherein an adhesive label with an integrated label carrier for accommodating an insert label which can be written on freely is provided.

7. The module front as claimed in claim 6, wherein the adhesive label has at least one pictogram.

8. A withdrawable switchgear assembly module, having a module front as claimed in claim 1.

9. An electrical switchgear assembly, having at least one switchgear assembly module as claimed in claim 8.

10. The electrical switchgear assembly as claimed in claim 9, wherein the electrical switchgear assembly is a low-voltage electrical switchgear assembly.

11. The electrical switchgear assembly as claimed in claim 9, wherein the electrical switchgear assembly is a medium-voltage electrical switchgear assembly.

12. The module front as claimed in claims 1, further comprising:

a front element in the form of a trough and having a trough base and four inner side walls and four outer side walls, whereas inner and outer side walls are arranged spaced apart from one another and enclose an intermediate space.

* * * * *